3,644,410
PREPARATION OF TRIALLYL CYANURATE
Harry D. Gregg, Jr., and Howard V. Lemaster, Mobile, Ala., assignors to Ciba-Geigy Corporation, Ardsley, N.Y.
No Drawing. Filed Feb. 27, 1970, Ser. No. 15,221
Int. Cl. C07d 55/50
U.S. Cl. 260—248 CS                    7 Claims

ABSTRACT OF THE DISCLOSURE

Triallyl cyanurate is prepared by reacting allyl alcohol with cyanuric chloride in the presence of an alkaline agent under specific conditions allowing the preparation of a very pure product.

DETAILED DESCRIPTION

This invention pertains to improvements in the preparation of triallyl cyanurate a valuable chemical cross-linking agent for the production of unsaturated polyesters, co-agent for ethylene propylene rubber systems, additive for polyesters, comonomer in unsaturated polyesters.

Presently known processes for the production of triallyl cyanurate are, for instance, described in the following patents.

U.S. Pat. 2,631,148 to R. G. Nelb describes a process of making triallyl cyanurate by adding at least three moles of sodium hydroxide to a slurry of one mole of cyanuric chloride in excess of three moles of allyl alcohol at a temperature not in excess of 10° C. Expensive refrigeration units are necessary to keep the temperature low.

James R. Dudley describes in U.S. Pat. 2,537,816 a method of preparing triallyl cyanurate by dissolving sodium hydroxide in allyl alcohol in the absence of applied heat. However, this process yields a discolored product which is obvious from Dudley's own statement in column 4, first paragraph where he discusses the substitution of sodium hydroxide by sodium carbonate in order to obtain less discoloration.

S. A. Lundberg describes the preparation of mono-esters and di-esters of cyanuric halides in U.S. Pat. 3,127,-399. The process is carried out by reacting under substantially anhydrous conditions at a temperature in the range of 60° C. to 110° C. a cyanuric halide, a primary, ethylenically-unsaturated monohydric alcohol, and an alkali bicarbonate. The problem in this process is the evolution of $CO_2$ gas which occurs during the reaction which occurs over a 5–8 hour period with reaction at the mono or disubstituted compound.

The present invention is a good solution to the heretofore stated problems in that it provides an improvement according to which pure triallyl cyanurate can be obtained in high yields by a highly economical process.

According to the present invention, triallyl cyanurate is prepared by reacting allyl alcohol with cyanuric chloride in the presence of alkali hydroxide with and without inert solvent, thereby adding a strong alkali hydroxide solution within 5 seconds to 5 minutes to a pre-cooled mixture consisting essentially of cyanuric chloride, allyl alcohol and ice in an allyl alcohol solvent or an inert solvent such as benzene, toluene or aromatic hydrocarbon to the reacting agents and their reaction product. Sodium chloride is added to the mixture. During the addition, the temperature is allowed to rise to a final temperature of from about 50° C. to about 85° C., preferably about 75° C., depending on desired cycle times which temperature is being maintained by external heating until reaction is complete. This takes from about 10 minutes to about 3 hours depending on the rate of the sodium hydroxide addition, the final temperature and the reactant stoichiometry. After the reaction is substantially completed, the aqueous phase is decanted, the remaining organic phase is washed with water at least twice, whereby the aqueous phase is again removed by bottom drain off. Finally, the organic solvent is removed by purging with an inert gas, azeotropic distillation with water, vacuum stripping at low pressures, or by combinations of these methods. Maximum yields of triallyl cyanurate 85% to 95% are obtained. The product obtained is very pure and almost colorless.

The process of the present invention can be used in both batch and continuous operations requiring a minimum of control and auxiliary equipment. The presently claimed process permits the use of highly alkaline agents at elevated temperatures without any adverse effects on the yield and purity of the prepared triallyl cyanurate as compared to prior art.

The fact that the reaction is carried out in the presence of strong alkaline agents at elevated temperatures thereby yielding a very pure product in high yields is not predictable, especially in view of the fact that known processes are either executed at low temperatures (between —10 and 30° C.) which has always been considered essential to obtain pure products or with weak alkaline agents in aqueous solution. It is surprising that the elevated temperatures in the presence of strong alkaline agents does not adversely affect product quality, particularly color. At the same time the reaction time is decreased. A further advantage of the present process employing elevated temperatures is that it eliminates large and expensive refrigeration units which are required for most of the known processes to maintain low temperatures.

In accordance with the present invention, allyl alcohol and cyanuric chloride are brought into contact under reactive conditions at elevated temperatures. The reaction medium used must be excess allyl alcohol or solvents substantially inert to both reactants and products and must be one in which at least one, preferably both, of the reactants is soluble. Suitable media include aqueous toluene, benzene, xylene or other aromatic hydrocarbons.

Suitable strong alkaline agents such as sodium hydroxide and potassium hydroxide are used as acid acceptors.

The process of the present invention has the advantage of eliminating any need for a preset or instantaneous pH control, and for a temperature control. Both conditions are very advantageous in commercial production. The temperature according to the instant process is simply kept at the desired temperature by precooling the reaction mixture to about —5° C. and regulating the heat from the exothermic reaction by a precalculated ice charge. The elevated temperatures during the reaction process make it possible to shorten the reaction time, and thus avoid formation of undesirable by-products.

Another advantage of the instant process is the absence of gas which evolves during the reaction when a carbonate or bicarbonate is used instead of a strong alkali.

Salt, particularly sodium chloride, can be added to increase the yield and accelerate the rate of reaction.

Preferred charges consist of cyanuric chloride: caustic: allyl alcohol in a molar ratio of 1.0:3.0 to 4.5:3.0 to 7.5. Toluene was employed as a solvent in a 1:1 to 5 weight ratio of CC to toluene. However, other ratios are not excluded.

The use of high quality toluene and high quality allyl alcohol with APHA color values of 5 APHA or less is particularly advisable to obtain an essentially colorless triallyl cyanurate. The use of high-quality caustic is also recommended. Further purifications with activated carbon are not required under these circumstances. The use of a nitrogen blanket is generally advisable.

Essentially quantitative recovery of the unreacted alcohol for reuse in subsequent batches is effected by the flash distillation of the alcohol-water azeotrope from combined and neutralized aqueous-alcohol product washings. No adverse effects on cycle time, yield or quality of triallyl cyanurate produced by using the recovered alcohol-water distillate occur. Thus, the recovery of the unreacted alcohol makes the presently claimed process even more economical.

A typical procedure for the preparation of triallyl cyanurate involves first the filling of a reaction vessel with a pre-cooled mixture containing cyanuric chloride, allyl alcohol and ice in toluene under a nitrogen blanket while stirring. The mixture is advantageously cooled by means of a cooling system containing a brine solution of between −10° and −5° C. Then the concentrated sodium hydroxide solution is added within a very short time as an acid acceptor. The temperature is rising in the reaction vessel during the reaction up to not more than 80° C.; the reaction is completed by applying heat for up to 2.5 hours depending on the alcohol and caustic charges. After decanting the aqueous phase and washing the organic phase twice with water, the organic phase containing the triallyl cyanurate is freed of solvent by reduced pressure distillation. The solvent may also be removed by nitrogen purging or steam-distillation at elevated temperatures. The heat for the solvent removal is provided by external steam. The residue, namely the desired triallyl cyanurate is filtered to improve clarity, stabilized and packaged.

The following example of this process will serve to further typify the nature of this invention.

Example

A 3 liter baffled glass reactor fitted with a water-jacketed condenser, a stirrer, a nitrogen inlet, a cooling system, an outlet for the aqueous solution to be decanted and an inlet for the reaction mixture was charged with toluene, sodium chloride, allyl alcohol, and ice. A nitrogen blanket was provided. The mixture was cooled by means of a cooling bath in which a brine solution of −10° C. to −5° C. was circulating. Within seconds a 50% sodium hydroxide solution was added. The final reaction temperature of 50–75° C. was obtained by the pre-determined ice charge and/or external cooling; later, the temperature was kept at 75° C. by external heating or by use of a reflux heat exchanger in those runs conducted at reflux temperatures until the reaction is complete, the reaction time being dependent on the temperature and reactant stoichiometry. During this time the mixture was kept at or below reflux. The aqueous phase was decanted and the remaining organic phase was washed twice with 500 g. of water each. The organic phase containing the triallyl cyanurate was transferred into a jacketed distillation apparatus wherein the organic solvents were evaporated under nitrogen and at a pressure of 50 mm. Hg with stirring at a temperature under 100° C. The clear colorless product was filtered, stabilized and packaged. Results, description of each run and analysis of the final products are shown in Table I attached.

The addition of the 50% strong alkaline solution is preferably carried out within about 5 seconds to about 5 minutes; the reaction is completed preferably between about 10 minutes and about 3 hours.

Alcohol recovery was effected by combining the decanted water washings, adjusting the pH to 6.5–7.0, flash distilling the alcohol along with some water until a condensate composite was obtained containing 25–28% by weight of allyl alcohol, representing a 99% recovery of unreacted alcohol.

What is claimed is:

1. In the process wherein allyl alcohol and cyanuric chloride are allowed to react in the presence of sodium hydroxide and a solvent so as to yield triallyl cyanurate, sodium chloride, and water, the improvement which comprises adding an aqueous alkali hydroxide solution within a short period of time to a pre-cooled mixture consisting essentially of cyanuric chloride, allyl alcohol and ice in an organic solvent allowing the temperature to rise to a final temperature of from about 50° C. to about 85° C., maintaining said temperature by external heating until reaction is complete, decanting the aqueous phase, washing the organic phase with water, removing the solvent, and recovering pure triallyl cyanurate.

2. The process according to claim 1 wherein sodium chloride is added to the reaction mixture before the addition of sodium hydroxide.

3. The process according to claim 1 wherein the solvent is toluene, xylene, aromatic hydrocarbon or other inert solvent or allyl alcohol.

4. The process according to claim 1 wherein the reaction temperature is 75° C.

5. The process according to claim 1 wherein the reaction time extends from about 10 minutes to about 3 hours.

6. The process according to claim 1 wherein the sodium hydroxide solution is added within 5 seconds to 5 minutes.

7. The process according to claim 1 wherein the reactants are used in a molar ratio of cyanuric chloride: caustic: allyl alcohol of 1.0:3.0 to 4.5:3.0 to 7.5.

References Cited

UNITED STATES PATENTS

| | | | |
|---|---|---|---|
| 2,537,816 | 1/1951 | Dudley | 260—248 |
| 2,631,148 | 3/1953 | Nelb | 260—248 |
| 3,127,399 | 3/1964 | Lundberg | 260—248 |

JOHN M. FORD, Primary Examiner